Aug. 15, 1939     K. PRADE     2,169,884
HOT PLATE
Filed Feb. 28, 1938
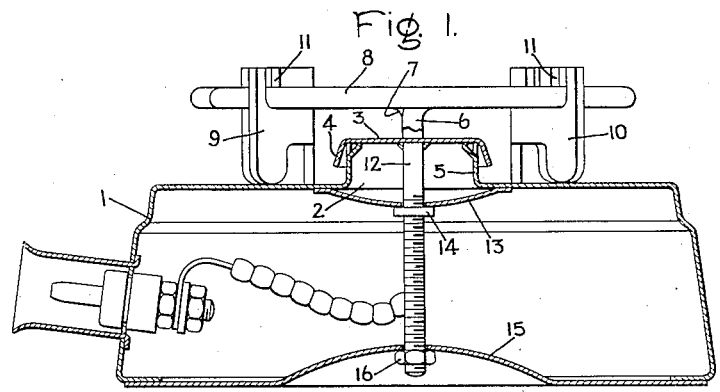
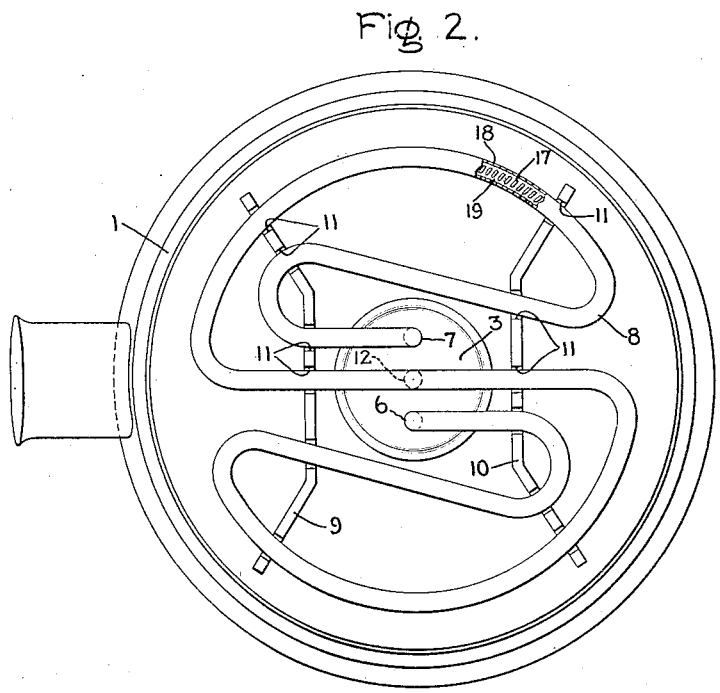
Inventor:
Karl Prade,
by Harry E. Dunham
His Attorney.

Patented Aug. 15, 1939

2,169,884

UNITED STATES PATENT OFFICE 2,169,884

HOT PLATE

Karl Prade, Nuremberg, Germany, assignor to General Electric Company, a corporation of New York Application February 28, 1938, Serial No. 193,189 In Germany March 18, 1937

3 Claims. (Cl. 219—37)

This invention relates to an electrically heated hotplate having a sheathed heating element, and it contemplates a hotplate of this character wherein both terminal ends of the heating element are arranged so as to be watertight in a casing arranged below the heating element and accommodating the connecting contacts. In this case, the heating element can easily be removed from the casing. This is effected according to this invention in the manner that the terminal ends of the heating element are secured in a cover which shuts off an upper opening of the casing. In order to prevent penetration of moisture, the edge of the cover overlaps a turned-up edge or flange of the casing opening.

Supports resting on the top wall of the casing are used for carrying the heating element. The supports have recesses in which the heating element rests. By using such supports the heating element is prevented from bending downwards and contact between the individual turns is avoided.

According to this invention, a bolt passed through the casing is provided which is secured to the cover shutting off the opening of the casing and which extends through the bottom of the casing. By means of a nut screwed on the lower part of the bolt the floor is firmly pressed against the casing.

For a more complete understanding of this invention, reference should be had to the accompanying drawing in which Fig. 1 is an elevation in section of an electric hotplate arranged in accordance with this invention; and Fig. 2 is a plan of the hotplate, with parts shown in section to illustrate certain details of construction.

Referring to the drawing, the casing 1 has an opening 2 which is shut off by a cover 3 in such a manner that the edge 4 of the cover overlaps the turned-up edge 5 of the casing opening. The terminal ends 6 and 7 of the sheathed heating element 8 are inserted water-tight in the cover 3.

Supports 9 and 10 resting on the casing 1 have recesses 11 for accommodating the heating element 8. On the cover 3 is further secured a threaded bolt 12. After the cover 3 has been placed on the edge 5 of casing 1, in the interior of the casing a trough-shaped radiation plate 13 is placed on the bolt 12 and by means of a nut 14 is pressed against the inner side of the upper casing cover. The part 13 is preferably formed as a trough-shaped radiation plate, because thereby an additional protection against penetration of heat and moisture into the casing of the boiling plate is obtained. The free end of the bolt 12, moreover, extends through the floor 15 of the casing 1. By means of the nut 16 screwed on the bolt 12 the floor is firmly pressed against the casing 1.

The sheathed heating element 8 preferably will be of the type described and claimed in the United States patent to C. C. Abbott, No. 1,367,341, dated February 1, 1921. As there described, the element comprises a helical resistance conductor 17 enclosed by an outer sheath 18 and supported in spaced relation with the sheath by a compacted layer 19 of electrically insulating and heat conducting material, such as powdered magnesium oxide.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. An electric hotplate comprising a sheathed heating element having down-turned terminal ends, a supporting casing having a top wall that holds said heating element, said top wall having an opening about which there is an upright flange, a cover on said flange closing said opening at the top, the cover having a down-turned flange that cooperates with said upright flange in overlapping relation, the down-turned terminal ends of said heating element directed down through said cover and moisture-proof joints between said terminal ends and said cover, a trough-shaped radiation plate within said casing closing said opening at the bottom, and means securing said cover and radiation plate in their respective positions closing said opening at the top and bottom.

2. An electric hotplate comprising a sheathed heating element having down-turned terminal ends, a supporting casing having a top wall that holds said heating element, said top wall having an opening about which there is an upright flange, a cover on said flange closing said opening, the cover having a down-turned flange overlapping said upright flange, the down-turned terminal ends of said heating element directed through said cover and moistureproof joints between said terminal ends and said cover, a bolt connected at its upper end to said cover and extending down through said casing, a radiation plate within said casing threaded on said bolt and closing said opening at the bottom, a nut on said bolt holding said radiation plate, a bottom wall closing said casing at the bottom and a second nut on said bolt securing said bottom wall.

3. An electric hotplate comprising a sheathed heating element having down-turned terminal ends, a supporting casing having a top wall that holds said heating element, said top wall having a central opening about which there is an upright flange, a cover on said flange closing said opening, the cover having a down-turned flange overlapping said upright flange, the down-turned terminal ends of said heating element being directed through said cover and having moisture-proof joints with said cover, a trough-shaped radiation plate below said opening at the bottom, and means detachably securing said radiation plate in its closing position.

KARL PRADE.